United States Patent [19]

Malley, deceased

[11] Patent Number: 4,528,977
[45] Date of Patent: Jul. 16, 1985

[54] ASSEMBLY FOR INTERCONNECTING AND ALIGNING SOLAR COLLECTORS AND LIKE MEMBERS FOR MOVEMENT TOGETHER

[75] Inventor: William G. Malley, deceased, late of San Jose, Calif., by Josephine Malley, heiress

[73] Assignee: Acurex Solar Corporation, Mountain View, Calif.

[21] Appl. No.: 477,002

[22] Filed: Mar. 21, 1983

[51] Int. Cl.³ .............................................. F24J 3/02
[52] U.S. Cl. .................................. 126/438; 126/424; 126/451; 350/637
[58] Field of Search ............... 126/438, 439, 451, 424; 350/288, 289, 304, 310; 248/605, 608, 606, 612, 635, 486

[56] References Cited

U.S. PATENT DOCUMENTS

| 2,906,257 | 9/1959 | Abbot | 126/438 X |
| 4,149,523 | 4/1979 | Boy-Marcotte | 126/438 X |
| 4,178,913 | 12/1979 | Hutchinson | 126/438 X |
| 4,386,600 | 6/1983 | Eggert, Jr. | 126/438 |

Primary Examiner—Larry Jones
Attorney, Agent, or Firm—Flehr, Hohbach, Test, Albritton & Herbert

[57] ABSTRACT

An assembly for connecting and aligning solar collectors for movement together in tracking relationship with the sun is disclosed herein. This assembly utilizes a pivot shaft having keyways at opposite ends and cooperating key members. The shaft is supported for rotation and the key members are fixedly connected with the collectors and key into the keyways, without requiring a force fit, in order to mechanically interlock the collectors and pivot shaft together and also to maintain the collectors in predesigned alignment with another.

6 Claims, 4 Drawing Figures

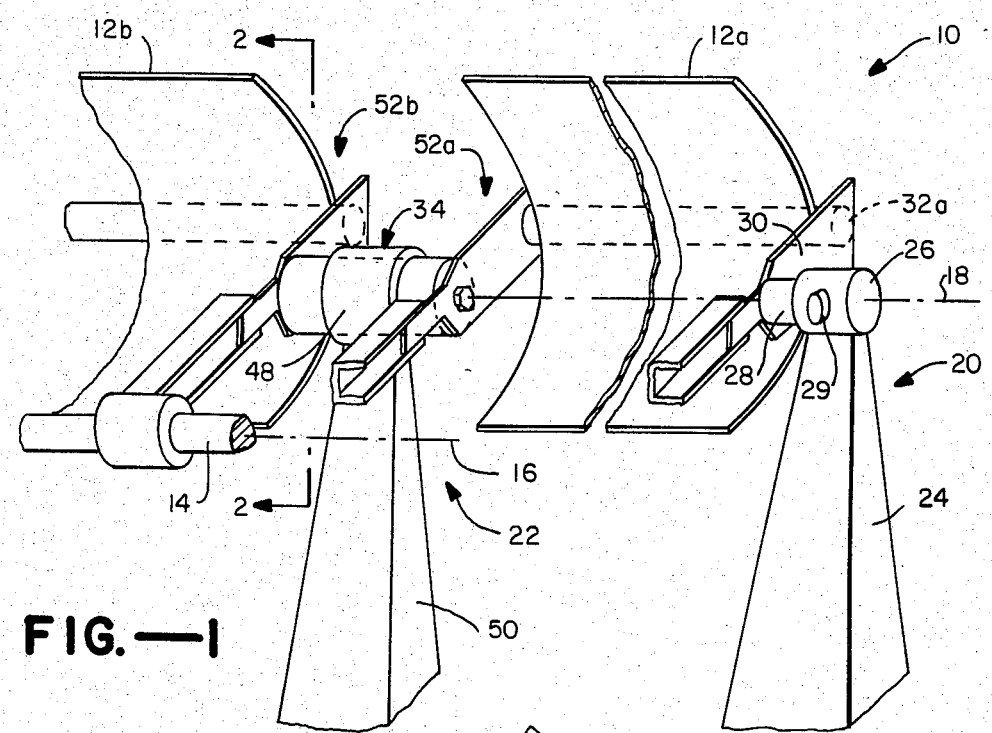
FIG.—1
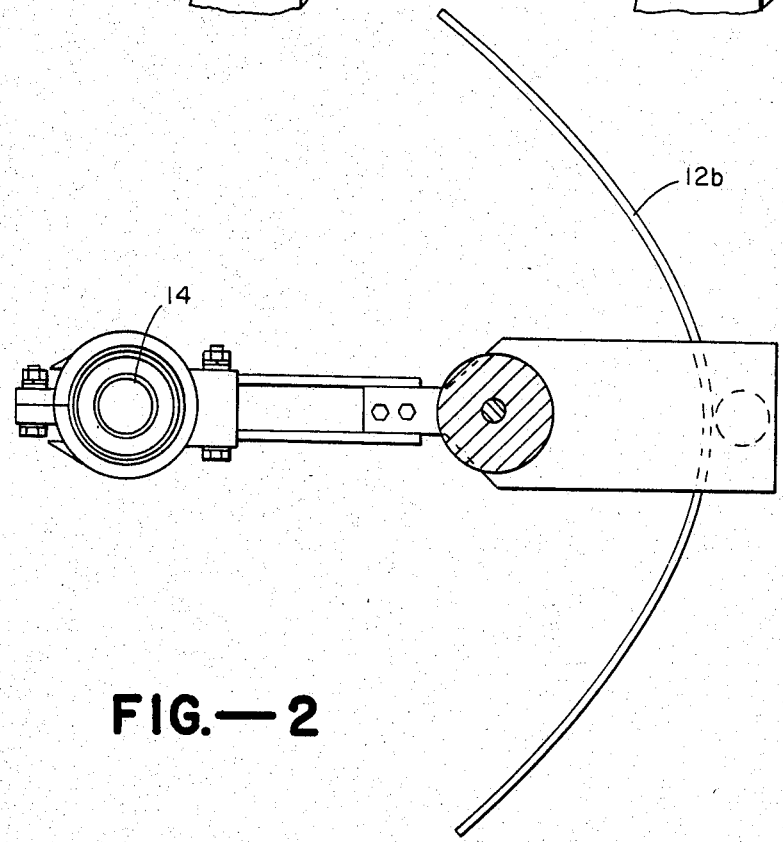
FIG.—2

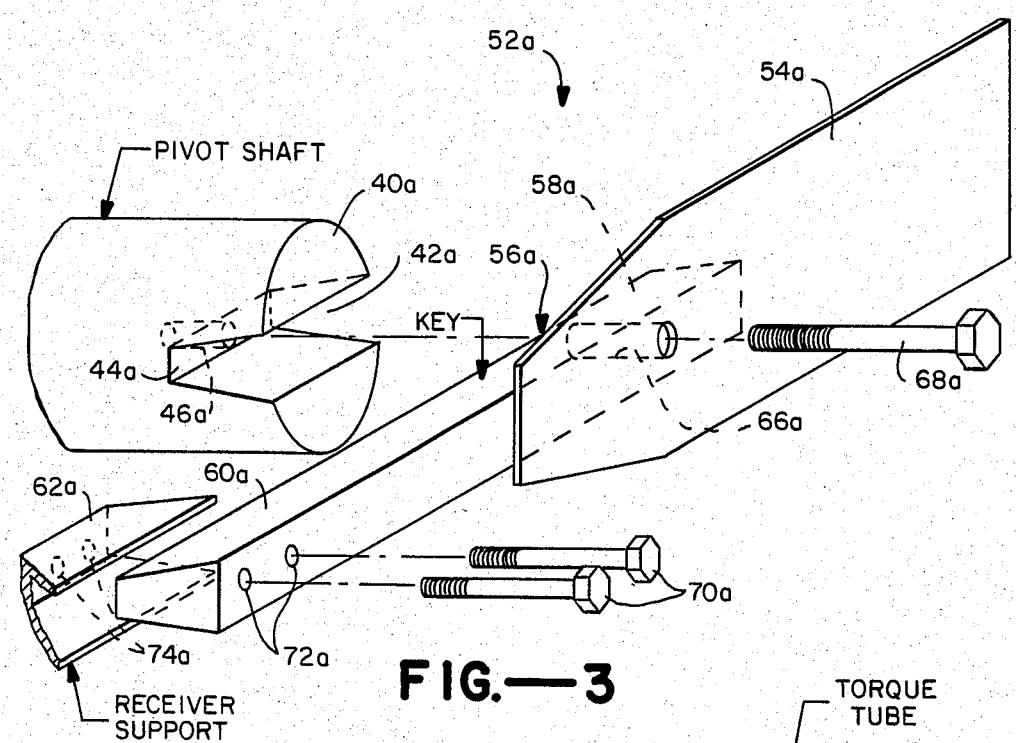
FIG.—3
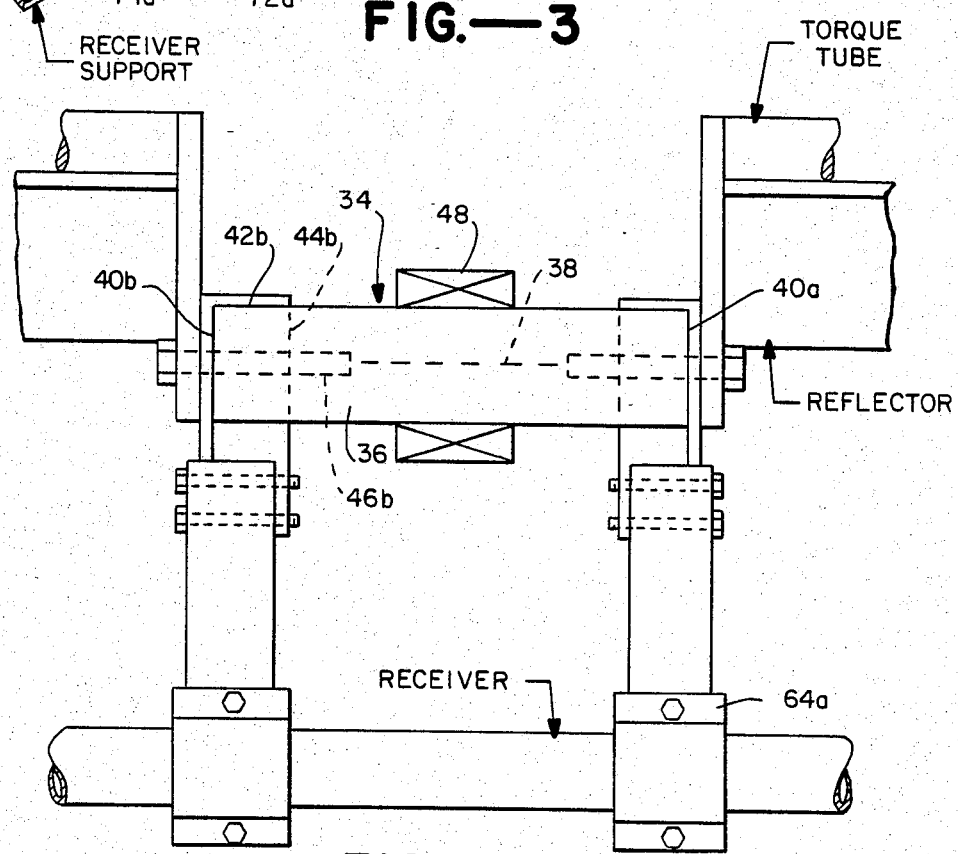
FIG.—4

ASSEMBLY FOR INTERCONNECTING AND ALIGNING SOLAR COLLECTORS AND LIKE MEMBERS FOR MOVEMENT TOGETHER

The present invention relates generally to support assemblies for structural members intended to move together and more particularly to a specific type of assembly for connecting and aligning solar collectors for movement together in tracking relationship with the sun.

In U.S. Pat. No. 4,135,493, a particular solar collecting system is described. This system is shown including a number of elongated parabolic reflectors and a continuous receiver located at the common focal line of the reflectors. These reflectors and the receiver can be supported as a single unit for rotational movement in tracking relationship with the sun as the latter moves across the sky.

In order for a system of the type just described to be successful, it is important for each of the reflectors to be initially readily but properly aligned with the other reflectors and also with its section of the common receiver and that they remain so throughout the tracking movement. It is also important from an economical standpoint that the interlocking components between adjacent collectors be uncomplicated and easy to assemble in the field.

It is therefore an object of the present invention to provide a combination interlocking and aligning assembly for use between adjacent end-to-end reflectors in a system of the type described above and specifically an assembly which meets the requirements just recited.

As will be described in more detail hereinafter, the assembly disclosed herein is not only suitable for interconnecting and aligning adjacent reflectors and an adjacent section of a common receiver in a system of the type described, but also for connecting and aligning other types of structural members which are intended to move together about a given axis. This assembly includes its own pivot shaft comprised of a main body with opposite ends which include first and second keyways extending axially towards one another. The pivot shaft is supported for at least limited movement about its own axis while the latter is maintained in coextensive relationship with the axis about which the structural members themselves move. At the same time, first and second interlocking and aligning means are fixedly connected to the first and second structural members, respectively, for movement therewith about this latter axis. These first and second interlocking and aligning means include first and second key members respectively configured to key into the first and second keyways forming part of the pivot shaft for interlocking the structural members with the shaft for movement about the coextensive axes while, at the same time, maintaining the structural members in predesigned alignment with one another.

The assembly just discussed briefly will be described in more detail hereinafter in conjunction with the drawings wherein:

FIG. 1 is a partially broken away perspective view of a solar collector system including at least two end-to-end reflectors and a common receiver as well as an assembly designed in accordance with the present invention for interlocking and aligning these reflectors and the receiver to one another for movement together about a given axis;

FIG. 2 is a vertical sectional view of the system illustrated in FIG. 1 taken generally along line 2—2 in FIG. 1;

FIG. 3 is an enlarged, exploded perspective view of the interlocking and aligning assembly illustrated in FIG. 1; and FIG. 4 is a top plan view of the interlocking and aligning assembly of FIG. 1.

Turning now to the drawings, wherein like components are designated by like reference numerals throughout the various figures, attention is first directed to FIG. 1 which illustrates an overall solar collector system generally indicated by the reference numeral 10. This system is shown including at least two elongated parabolic reflectors 12 and a common receiver 14 which is adapted to carry a suitable heat transfer medium such as water in a continuously flowing manner. As will be described in more detail below, the reflectors are maintained in end-to-end relationship to one another so as to define a single, common focal line 16. At the same time, the receiver 14 is maintained in coextensive relationship with focal line 16 while it moves along with the reflectors about a parallel axis 18 in tracking relationship with the sun.

The reflectors 12 and receiver 14 are supported in the manner described above by means of a drive assembly generally indicated at 20 and one or more interlocking and aligning assemblies 22 designed in accordance with the present invention. As illustrated in FIG. 1, the drive assembly includes an upstanding base 24 located adjacent to the free end of an endmost reflector 12 which, for purposes of clarity, will be designated as reflector 12a. The next successive reflector will be designated at 12b. A suitable speed reducer 26 is supported on top of base 24 and includes a drive shaft 28 disposed in coextensive relationship with axis 18. The free end of drive shaft 28 is connected to one end of an elongated flange member 30 by means of the present invention. The opposite end of this flange member is welded or otherwise fixedly connected to the free end of reflector 12a by means of a torque tube 32a. More specifically, as seen in FIG. 1, both of the reflectors 12a and 12b have welded or otherwise fixedly connected to their backends respective torque tubes 32a and 32b which are positioned in parallel, co-planar relationship with axes 16 and 18. The end of flange member 30 opposite drive shaft 28 is welded or otherwise fixedly connected to the adjacent end or torque tube 32a. In this way, a drive motor diagrammatically indicated at 29, acting through the speed reducer 26 is able to rotate reflector 12a about axis 18. At the same time, as will be seen below, assembly 22 connects reflector 12b and receiver 14 for movement with reflector 12a while maintaining the presence of common focal line 16 and while maintaining the receiver in coextensive relationship with this common focal line.

Referring to FIGS. 2-4 in conjunction with FIG. 1, attention is now directed to an assembly 22 which is intended to interconnect the adjacent ends of adjacent reflectors 12a and 12b while simultaneously supporting a corresponding section of receiver 14. This assembly is shown including a pivot shaft 34 comprised of a cylindrical main body 36 defining a central axis of rotation 38 extending between opposite ends 40a and 40b of the main body, as best illustrated in FIG. 4. As best illustrated in FIG. 3, a right end section of shaft 34, as viewed in this figure, includes a slotted keyway 42a extending axially inward from end 40a so as to define an innermost shoulder 44a. A threaded opening 46a extends further into shaft body 36 from shoulder 44a in coextensive relationship with central axis 38. An identical keyway 42b extends into shaft body 36 from end 40b and includes a corresponding shoulder 44b and a corresponding threaded opening 46b, as best illustrated in FIG. 4. The intended function of the pivot shaft as well as its keyways and associated threaded openings will be apparent hereinafter.

As best illustrated in FIGS. 1 and 4, pivot shaft 34 is supported within a bearing housing 48 for rotational movement about its central axis 38 and the bearing housing is mounted on a support post 50 which maintains the pivot shaft's central axis in coextensive relationship with previously recited axis 18 about which the reflectors 12 and the receiver 14 are intended to rotate. Bearing housing 48 and support post 50 form part of the overall assembly 22 along with pivot shaft 34.

In addition to the components thus far described, assembly 22 includes an arrangement 52a for interlocking and aligning the righthand end of pivot shaft 34 with the lefthand end of reflector 12a (as viewed in FIG. 1) and an arrangement 52b for interlocking and aligning the lefthand end of shaft 34 with the righthand end of reflector 12b (again, as viewed in FIG. 1). As will be seen below, these arrangements not only interlock adjacent ends of the adjacent reflectors 12a and 12b with opposite ends of shaft 34 so as to provide a common focal line but they also fixedly support an adjacent section of the common receiver 14 on the focal line and maintain this relationship throughout movement of the reflectors and receiver.

Arrangement 52a is best illustrated in FIG. 3. As seen there, it includes an elongated flange 54a which is welded or otherwise fixedly connected to the lefthand end of reflector 12a at the adjacent end of its torque tube 32a. The other end of the flange carries an elongated key member 56a which projects outward in a rectangular but slightly tapering fashion from the front face of the flange member, that is, towards pivot shaft 34. A section 58a of the key member is disposed within the confines of flange 54a and a section 60a extends out beyond the flange. In addition to these components, overall arrangement 52a includes an elongated, generally U-shaped or channeled support arm 62a and an annular flange 64a (FIG. 4) suitably fixedly connected to one end thereof. For reasons to become apparent hereinafter, flange 54a and section 58a of key member 56a include a common opening 66a.

As best illustrated in FIG. 4 in conjunction with the other figures, section 58a of key member 56 is configured to key into keyway 42a of shaft 34 for interlocking flange 54a and therefore reflector 12a with pivot shaft 34 in a specifically aligned fashion. Moreover, section 58a is positioned within keyway 42a such that passageway 66a is coaxially aligned with threaded opening 46a. In this way, a bolt 68a may be provided through the passageway 66a and thread connected into opening 46a for preventing the key member from longitudinally separating from its keyway, without requiring a force fit. At the same time, since the axis of the threaded opening 46a is perpendicular to the keyway, the bolt is not subjected to any appreciable torque.

With section 58a of key member 56a keyed into keyway 42a in the manner just described, section 60a of the key member is maintained in a fixed position relative to reflector 12a and the shaft. This section of the key member is designed to receive one end section of channeled support arm 62a as best illustrated in FIGS. 1, 2 and 4. The two are fixedly connected together by a suitable means such as bolts 70a extending through cooperating openings 72a or 74a in section 60a and support arm 62a respectively. This, in turn, places the connecting arm in predetermined alignment with respect to reflector 12a and shaft 34 which, in turn, places annular flange 64a in fixed alignment with these latter components, specifically in coaxial relationship with focal line 16. As a result, the section of receiver 14 supported by annular flange 64a as best illustrated in FIGS. 2 and 4 is maintained in coaxial alignment with focal line 16.

Having described overall arrangement 52a, it should be apparent that arrangement 52b is identical in function to arrangement 52a but structurally its mirror image. Arrangement 52b therefore includes its own flange 54b, key member 56b, connecting arm 62b and annular flange 64b. These components along with bolts 68b and 70b serve to interlock and align the left end of shaft 34 with the right end of reflector 12b while simultaneously supporting a second section of the receiver 14 in coaxial relationship with focal line 16. Also, it should be apparent that this arrangement is also suited for connecting a reflector to the output shaft of the speed reducer.

From the foregoing, it should be apparent that overall assembly 22 serves to connect reflectors 12a and 12b to one another as the latter are caused to rotate about axis 18 by means of drive assembly 20. At the same time, assembly 22 causes the reflectors to maintain a common focal line and supports a lengthwise segment of receiver 14 in coaxial relationship with the focal line as the reflectors move about axis 18. While overall solar collector 10 is shown including only two reflectors, and one assembly 22, it should be apparent that this system could include a greater number of reflectors and a greater number of assemblies 22, one between the adjacent ends of each adjacent pair of reflectors. Also, one or more driver assemblies 20 could be utilized to rotate the reflectors and common collector, although only one such assembly is necessary where a small number of reflectors are used.

What is claimed is:

1. An assembly for connecting and aligning first and second adjacent solar reflectors forming part of an overall solar collecting arrangement for movement together about a given axis in specific tracking relationship with the sun and for ensuring that said reflectors move together and in predesigned alignment with one another, said assembly comprising:
   (a) a pivot shaft having a central axis of rotation and including a main body with opposite ends normal to said central axis and first and second keyways respectively extending into said main body from its opposite ends;
   (b) means supporting said pivot shaft for at least limited movement about its central axis while maintaining said central axis in co-extensive relationship with said given axis; and
   (c) first and second interlocking and aligning means fixedly connected to said first and second reflectors, respectively, for movement therewith about said given axis, said first and second means including first key members configured to key into said first and second keyways, respectively, for interlocking said first and second reflectors with said shaft for movement about said co-extensive axes while said reflectors remain in predesigned alignment with one another.

2. An assembly according to claim 1 wherein said pivot shaft includes first and second threaded openings into its main body along said central axis from the inward ends of said first and second keyways, respectively, wherein said first and second key members include through-holes respectively disposed in axial alignment with said threaded openings when the key members keyed into their keyways, and wherein said first and second interlocking and aligning means include first and second threaded bolt means respectively extending through the through-holes of said first and second key members and into threaded engagement with said first and second threaded openings, respectively, for holding said key members in said keyways without requiring a force fit.

3. An assembly according to claim 1 wherein said solar reflectors together define a coextensive focal line and wherein said overall solar collecting arrangement includes a common tubular receiver, said assembly including means for supporting said receiver along said focal line, said receiver supporting means including portions of said key member for ensuring that the receiver remains in position along said focal line as said reflectors move about said given axis.

4. An assembly for connecting together and aligning first and second structural members which are adapted to move together in a predetermined way, said assembly comprising:
 (a) an elongated interconnecting member having a main body with opposite ends and first and second keyways respectively extending into said main body from said opposite ends; and
 (b) first and second interlocking and aligning means fixedly connected to said first and second structural members, respectively, for movement therewith in said predetermined manner, said first and second means including first and second key members configured to key into said first and second keyways, respectively, for interlocking said first and second structural members with said elongated interconnecting means for movement in said predetermined manner while said structural members remain in predesigned alignment with another; and
 (c) said elongated interconnecting member including first and second threaded openings into its main body from the inward ends of said first and second keyways, respectively, wherein said first and second key members include through-holes respectively disposed in axial alignment with said threaded openings when the key members are keyed into their keyways, said first and second interlocking and aligning means including first and second threaded bolt means respectively extending through the through-holes of said first and second key members and into threaded engagement with said first and second threaded openings, respectively, for holding said key members in said key ways without requiring a force fit, said first and second structural members being adapted to move together about a given axis, said elongated interconnected member being a pivot shaft having a central axis of rotation in co-axial relationship with said keyways and threaded openings, and said assembly including means supporting said pivot shaft for at least limited movement about its central axis while maintaining said central axis in co-extensive relationship with said given axis.

5. A solar collecting arrangement, comprising:
 (a) a plurality of solar collectors having elongated parabolic reflectors defining their own focusing lines and a common receiver, the reflectors being positioned in end-to-end alignment with one another so as to place their focal lines in colinear relationship with one another and such that said common receiver is positioned in coextensive relationship with said colinear focal lines;
 (b) an assembly for connecting each pair of adjacent ends of adjacent ones of said reflectors and said receiver for movement together about a given axis parallel to and spaced from said receiver while maintaining said end-to-end alignment, each of said assemblies including
  (i) a pivot shaft having a central axis of rotation and including a main body with opposite ends normal to said central axis, first and second keyways respective extending into said main body from its opposite ends and along said central axis, and first and second threaded openings extending further into said main body from the innermost ends of said keyways, respectively,
  (ii) means supporting said pivot shaft for at least limited movement about its central axis while maintaining said central axis in co-extensive relationship with said given axis,
  (iii) first and second interlocking and aligning means fixedly connected the adjacent ends of the adjacent reflectors, respectively, for movement therewith about said given axis, said first and second means including first and second key members configured to key into said first and second keyways, respectively, for interlocking said adjacent reflectors with said shaft for movement about said coextensive axes while said adjacent reflectors remain in said end-to-end alignment with one another, and first and second threaded bolts respectively cooperating with said first and second key members and said first and second threaded openings for locking said key members into their respective keyways without the need for force fits; and
  (iv) first and second elongated channel arms configured to fixedly receive portions of said first and second key members respectively, at first ends thereof, said first and second arms including means at opposite ends thereof to fixedly support said receiver; and
 (c) means for rotating one of said collectors about said given axis whereby said assemblies interlock all of the other collectors for simultaneous movement therewith while maintaining their respective reflectors in said end-to-end alignment with one another.

6. An assembly for connecting and aligning first and second structural members for movement together about a given axis, said assembly comprising:
 (a) a pivot shaft having a central axis of rotation and including a main body with opposite ends normal to said central axis and first and second keyways respectively extending into said main body from its opposite ends;
 (b) means supporting said pivot shaft for at least limited movement about its central axis while maintaining said central axis in co-extensive relationship with said given axis;
 (c) first and second interlocking and aligning means fixedly connected to said first and second structural members, respectively, for movement therewith about said given axis, said first and second means including first key members configured to key into said first and second keyways, respectively, for interlocking said first and second structural members with said shaft for movement about said coextensive axes while said structural members remain in predesigned alignment with one another; and (d) said pivot shaft including first and second threaded openings into its main body along said central axis from the inward ends of said first and second keyways, respectively, said first and second key members including through-holes respectively disposed in axial alignment with said threaded openings when the key members keyed into their keyways, and said first and seond interconnecting and aligning means including first and second threaded bolt means respectively extending through the through-holes of said first and second key members and into threaded engagement with said first and second threaded openings, respectively, for holding said key members in said keyways without requiring a force fit.

* * * * *